United States Patent [19]
Douglas et al.

[11] Patent Number: 5,680,389
[45] Date of Patent: Oct. 21, 1997

[54] DATA TRANSMISSION SYSTEM

[75] Inventors: David Douglas; Gordon T. Hathaway, both of Ipswich; Stephen Searby, Woodbridge, all of England

[73] Assignee: British Telecommunications public limited company, London, England

[21] Appl. No.: 733,199

[22] Filed: Oct. 17, 1996

Related U.S. Application Data

[63] Continuation of Ser. No. 274,297, Jul. 12, 1994, abandoned.

[30] Foreign Application Priority Data

May 27, 1994 [EP] European Pat. Off. ............ 94303840

[51] Int. Cl.$^6$ ................................................. H04J 3/14
[52] U.S. Cl. .................... 370/228; 370/242; 370/464; 375/260
[58] Field of Search ........................ 370/216, 225, 370/226, 227, 228, 229, 235, 241, 242, 243, 244, 245, 246, 247, 248, 249, 250, 251, 252, 217, 218, 219, 220, 431, 433, 464, 465, 468, 535, 437, 498, 517; 340/825.01, 825, 825.03, 825.16, 825.17; 375/259, 260, 267, 299, 347; 455/101, 59, 65, 276.1, 277.1, 277.2, 278.1

[56] References Cited

U.S. PATENT DOCUMENTS

| | | | |
|---|---|---|---|
| 4,799,237 | 1/1989 | Itoh | 375/260 |
| 5,285,441 | 2/1994 | Bansal et al. | 370/16 |
| 5,414,414 | 5/1995 | Suzuki | 370/16 |
| 5,448,572 | 9/1995 | Knox et al. | 370/16 |

FOREIGN PATENT DOCUMENTS

| | | |
|---|---|---|
| 0310110 | 4/1989 | European Pat. Off. |
| 0359261 | 3/1990 | European Pat. Off. |
| 0454036 A1 | 10/1991 | European Pat. Off. |
| 0454249 A1 | 10/1991 | European Pat. Off. |

OTHER PUBLICATIONS

Patent Abstracts of Japan, vol. 5, No. 171 (E–080) & JP-A-56 098 033 (Fujitsu Ltd.).

*Primary Examiner*—Wellington Chin
*Assistant Examiner*—Huy D. Vu
*Attorney, Agent, or Firm*—Nixon & Vanderhye P.C.

[57] ABSTRACT

A data transmission system comprising a transmit unit 2 having a buffer 22 for generating a delayed version of the transmitted data signal and the receive unit 4 comprising a buffer 47 for generating a delayed version of the received data signal, error detection means for detecting errors in the received data signal and means for signalling the transmit unit 2 to transmit the delayed version of the transmitted data signal.

14 Claims, 11 Drawing Sheets

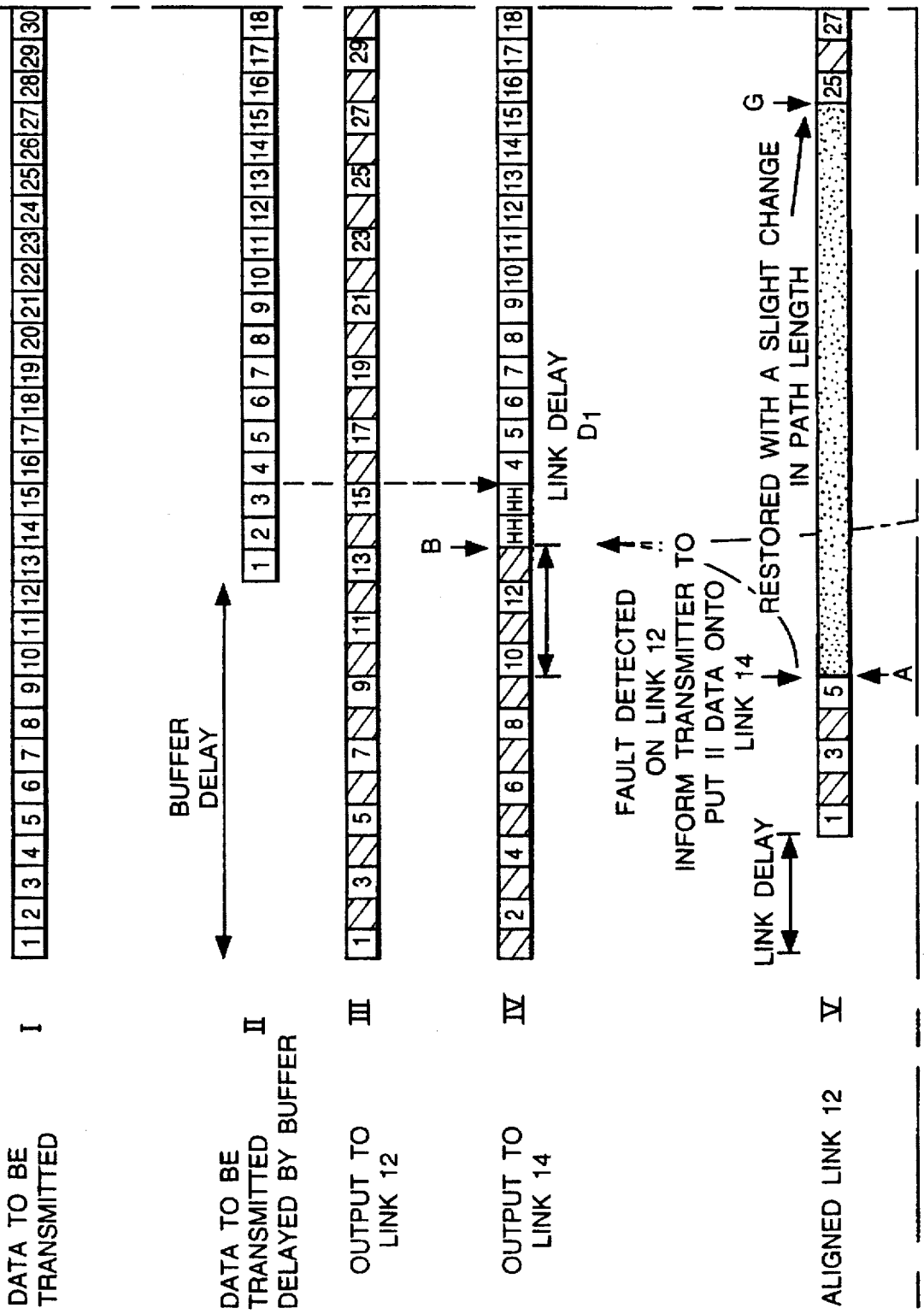

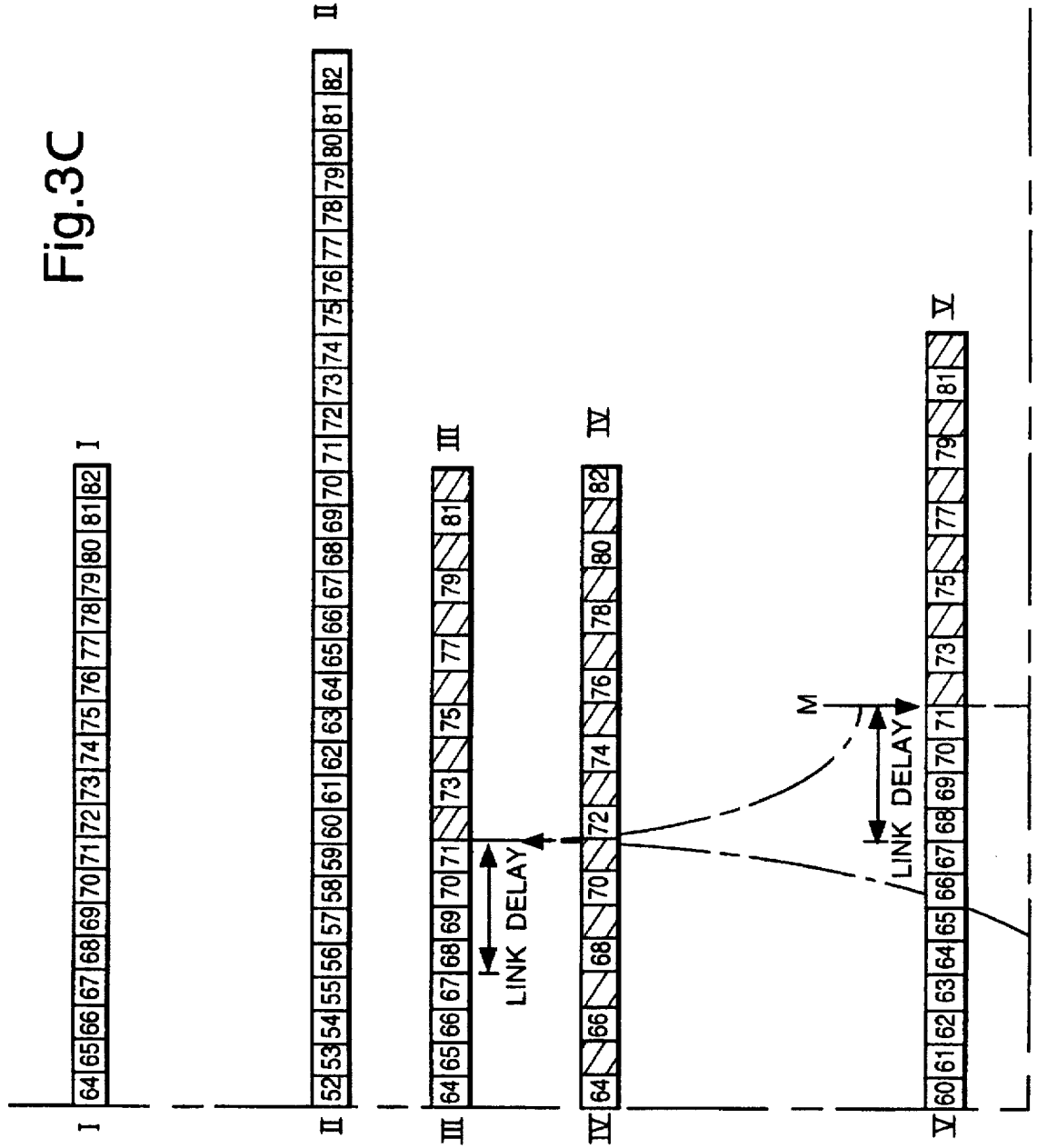

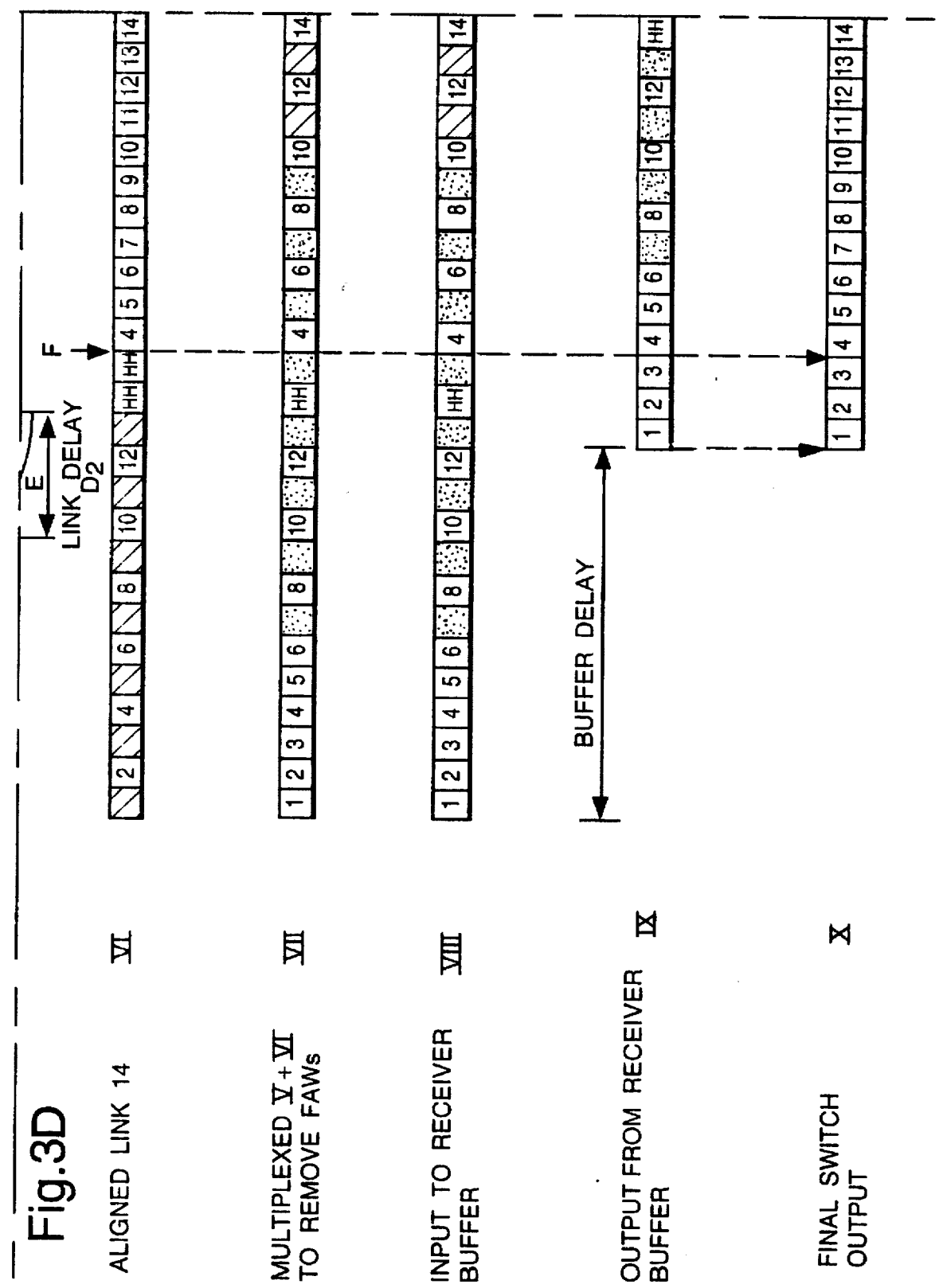

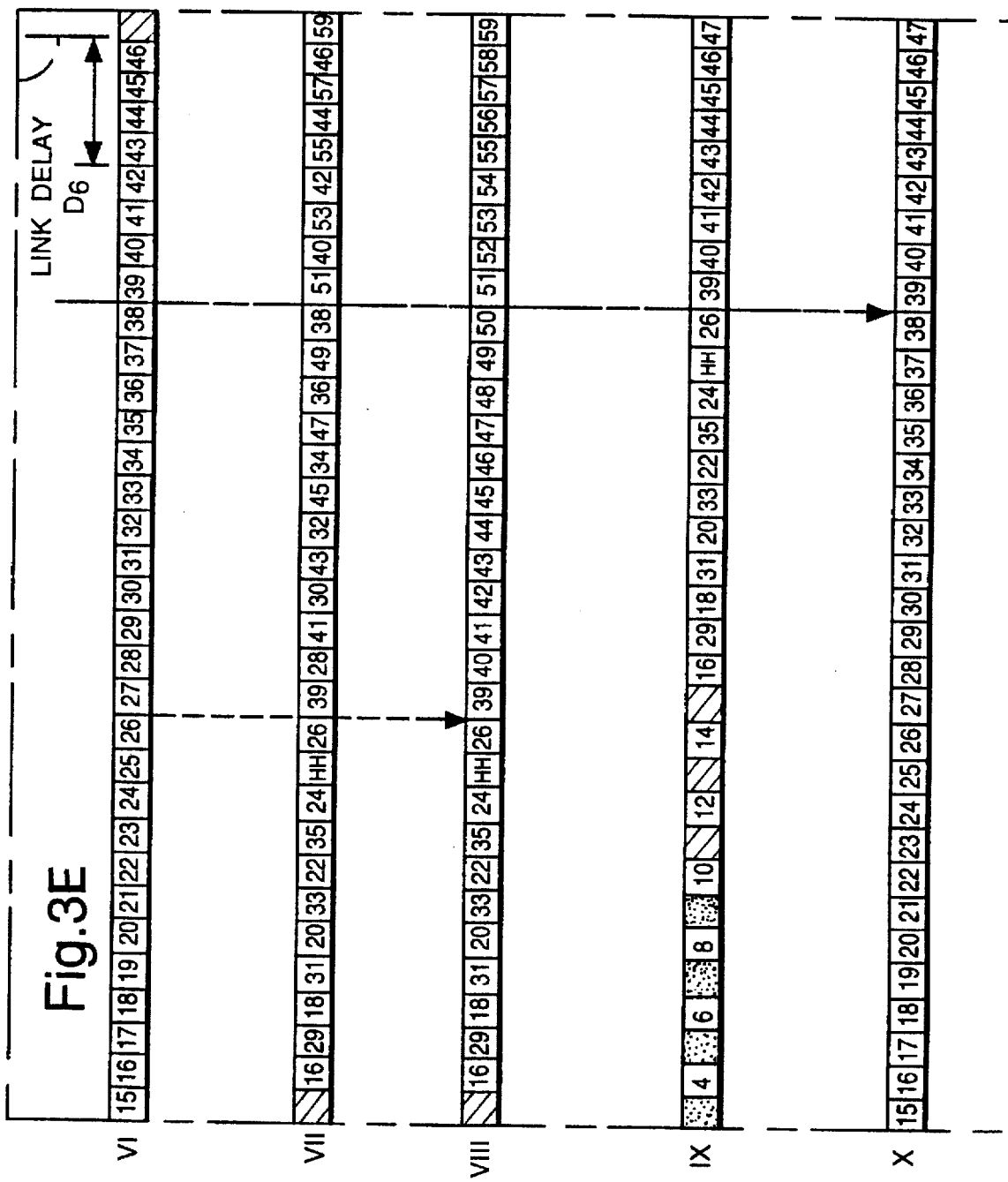

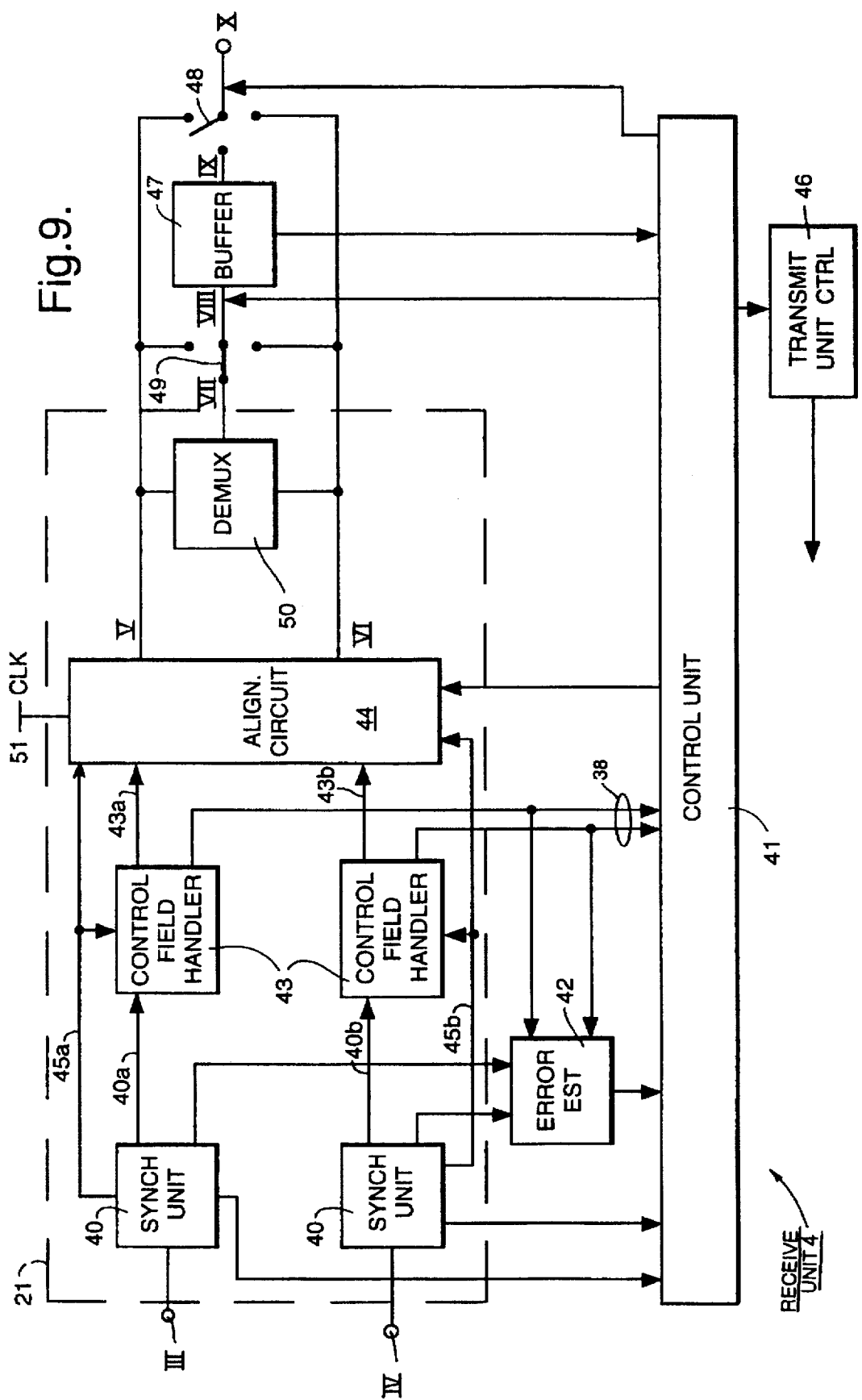

5,680,389

DATA TRANSMISSION SYSTEM

This is an FWC of application Ser. No. 08/274,297, filed Jul. 12, 1994, now abandoned.

BACKGROUND OF THE INVENTION

1. Field of the Invention

This invention relates to data transmission systems and in particular to a system for improving the integrity of data output from a receiver.

2. Related Art

There are many occasions when it is required to transmit data over long distances via a transmission path. Up until now users have had to rely on the integrity of the transmission path and to tolerate corruption in the data that may result, for instance if a fault occurs on the path. In the case of a fault, the data may be automatically routed over an alternative path, but parts of the data will be irretrievably lost whilst this rerouting is established.

SUMMARY OF THE INVENTION

According to the invention there is provided a data transmission system comprising a transmit unit for transmitting a data signal to a receive unit, the transmit unit comprising a buffer for generating a delayed version of a data signal to be transmitted, the transmit unit being switchable between a first mode in which the data signal is transmitted and a second mode in which the delayed version is transmitted, the receive unit comprising a buffer for generating a delayed version of a received data signal, the receive unit being switchable between a first mode in which the delayed version of the received data signal is conducted to a receive unit output and a second mode in which the received data signal is conducted to the receive unit output, the receive unit further having detection means for detecting errors in the received data signal and means responsive to such detection to switch the receive unit from the first mode to the second mode and to send a command to effect switching of the transmit unit from the first mode to the second.

The output of such a system is thus not interrupted when an error is detected. The system is applicable to any field in which a high degree of integrity of data is required, for instance the field of broadcast television or computer data transmission.

The transmission path may comprise two or more separate transmission links, the combined capacity of the transmission links being greater than the maximum capacity of the data traffic to be transmitted. Preferably, the capacity of each transmission link is identical. In one preferred embodiment of the invention, one back up link is provided for each required link i.e. double the maximum traffic capacity is available. Alternatively, one back up link may be provided for n required links or m back up links for n required links where m<n. In this case, the capacity provided will be (m+n)/n times the capacity of one link, when the capacity of the back up links and the transmission links is identical.

Preferably, the transmit unit further includes multiplexing means for multiplexing the data signal to be transmitted and control data including alignment information over the transmission links and the receive unit includes means for demultiplexing the data signal received over the transmission links. During normal operation, the data signal preferably is multiplexed over the transmission links and, when a fault is detected, the data signal stored in the buffer of the transmit unit is transmitted continuously over a single transmission link.

According to a further aspect of the invention, a method of transmitting a data signal comprising generating a delayed version of a data signal, selectively transmitting either the data signal or the delayed version thereof, examining a received data signal for errors, generating a delayed version of the received data signal and selectively outputting either the received data signal or the delayed version thereof wherein, in normal operation, the data signal is transmitted and the delayed version of the received data signal is output from the receive unit and, if an error is detected, sending a command to effect the transmitting of the delayed version of the data signal and outputting the received data signal.

According to a still further aspect of the invention, a receiver comprising a buffer for generating a delayed version of a received data signal, the receiver being switchable between a first mode in which the delayed version of the received data signal is conducted to a receiver output and a second mode in which the received data signal is conducted to the receiver output, the receiver further having detection means for detecting errors in the received data signal and means responsive to such detection to switch the receiver from the first mode to the second mode and to signal a remote transmitter to resend the data signal.

According to a still further aspect of the invention, apparatus for transmitting a data signal comprising a buffer for generating a delayed version of the data signal, a multiplexer for multiplexing the data signal and control information over at least two transmission links and switching means for determining which of the data signal the multiplexed data signal or the delayed version of the data signal is to be transmitted over which of the transmission links.

Preferably control communication from the transmit unit to the receive unit is carried over the transmission path by the insertion of control data between the data to be transmitted. Reverse control communication is preferably carried over an alternative transmission path.

BRIEF DESCRIPTION OF THE DRAWINGS

The invention will now be further described by way of example only with reference to the accompanying drawings in which:

FIGS. 3a–3c and 3d–3f are timing diagrams of the operation of the data transmission system shown in FIG. 1;

FIG. 9 is a detailed diagram of a receive unit of a data transmission system as shown in FIG. 1;

DETAILED DESCRIPTION OF EXEMPLARY EMBODIMENTS

Figure 1:
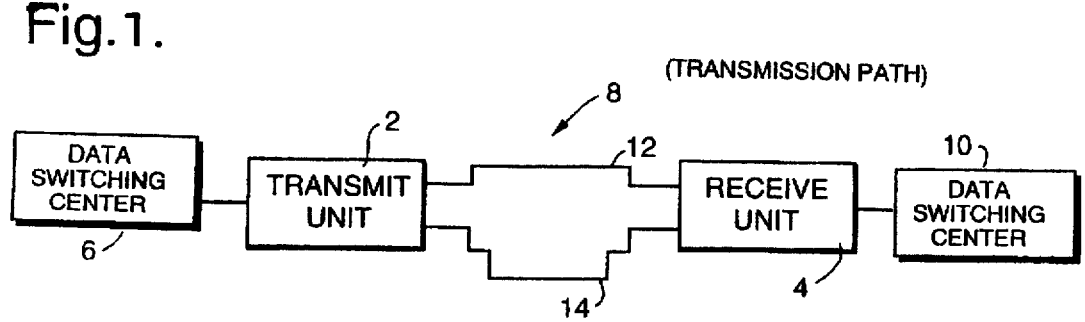
FIG. 1 is a schematic diagram of a data transmission system according to the invention.

A data transmission system as shown in FIG. 1 comprises a data transmission transmit unit 2 located between a first data switching centre 6, for instance an outside broadcast unit or satellite studio, and a transmission path 8. A data transmission receive unit 4 is located between the transmission path 8 and a second data switching centre 10, for instance a TV centre.

Figure 2:
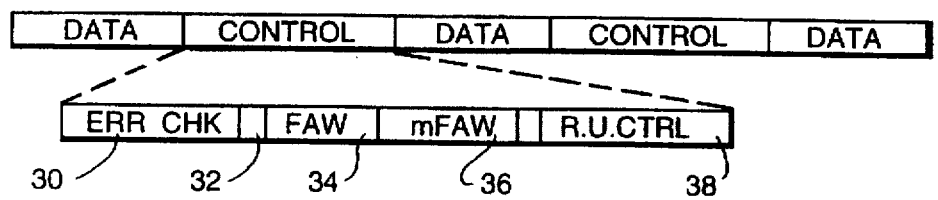
FIG. 2 is an example of the framing structure used on each of the transmission paths of FIG. 1.

The transmission path 8 comprises two links 12, 14 which may have significant differences in path lengths. During normal operation, the data from the first switching centre 6 are multiplexed between both links 12 and 14, so that the effective data rate of each link is halved. As shown in FIG. 2, control data are carried transparently in the spare data slots of the links. In the example shown, 32 bits are used for the transmitted data followed by 32 bits for the control. The control data comprises error checking bits 30, a parity bit 32 for extra protection, a frame alignment word (FAW) 34 so that the data on each link can be aligned at the receive unit to be 180° out of phase, a multiframe alignment word (MFAW) 36 to indicate the start of a multiframe and the link in use and a receive unit control word 38 for communication between the two units. The control data may not occupy the entire spare capacity. The framing structure will depend on the number of links in the protected transmission system and the information being carried.

The operation of the data transmission system of FIG. 1 will now be described in more detail with reference to FIGS. 3a–3f and 4 to 7. FIGS. 3a–3f (3a–3c being assembled in line above 3d–3f) show the timing of the signals at the transmit unit 2 and the receive unit 4. The data to be transmitted is indicated by signal I. The data output from the transmit buffer 22 is indicated by signal II. Signals III and IV are the signals sent over link 12 and link 14 respectively and signals V and VI are the aligned signals output from alignment circuitry of the receive unit 4. These signals are demultiplexed to form a continuous signal VII. VIII and IX denote the input to and output of the receive buffer 47 respectively and X denotes the resulting output of the receive unit 4.

FIGS. 4 to 7 show block diagrams of the data transmission system as shown in FIG. 1. For simplicity, the transmit unit 2 is illustrated as comprising a transmit buffer 22 and a switch 29 having a signal multiplexer 20. Similarly, the receive unit 4 is illustrated as comprising a signal demultiplexer 21, a switch 49, a switch 48 and a receive buffer 47.

Figure 4:
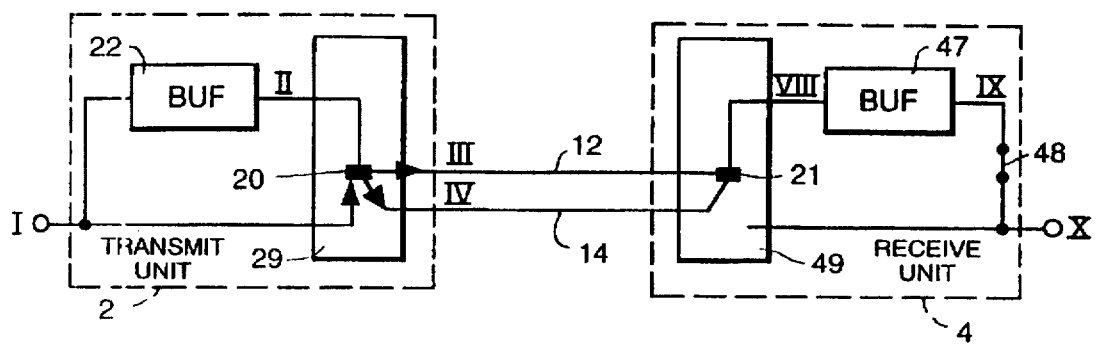
FIG. 4 is a block diagram of the system of FIG. 1 in a normal state of operation.

Under normal conditions, as shown in FIG. 4, incoming data to be transmitted I is input to the switch 29 and is also stored in the transmit buffer 22 of the transmit unit 2. The multiplexer 20 multiplexes the incoming data and control information over both of the transmission links 12, 14 (as indicated in FIG. 3 by the signals III and IV). At the receive end, the data output from links 12 and 14 will be delayed by the respective path length of the transmission links. The data on the transmission links therefore is aligned (signals V and VI) by alignment circuitry (not shown in FIGS. 4 to 7) and the integrity of the control data checked (as will be described below) before the transmitted data is demultiplexed from the control data by the demultiplexer 21 (signal VII) and input to the receive buffer 47 (signal VIII). The data is output from the receive buffer (signal IX) and then transmitted to the decoding apparatus 10 as shown in FIG. 1.

Figure 5:
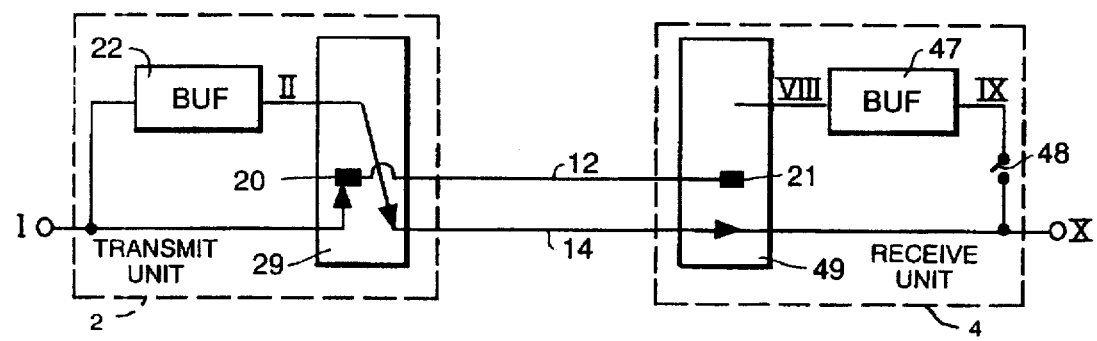
FIG. 5 is a block diagram of the system of FIG. 1 in a fault state.

If a fault occurs on link 12, the multiplexed data on link 12 will not reach the receive unit and loss of alignment is detected at the receive unit (see time A of signal V). The receive unit 4 signals this fault to the transmit unit 2 which, after a delay $D_1$, responds by switching in the transmit buffer 22. Thus the unmultiplexed continuous data (signal II) stored in the transmit buffer 22 is re-transmitted on link 14, preceded by frame alignment information, as indicated at time B of signal IV. The buffered, continuous data is received by the receive unit 4, after a delay $D_2$, and the switch 48 of the receive unit responds by synchronously switching out the receive buffer 47 at time F and the retransmitted traffic (signal VI) is directly conducted to the output of the receive unit (signal X) as shown in FIG. 5. Continuous data is transmitted along link 14 until correct operation on link 12 is restored.

Thus protection is provided by 'moving' a buffer from the receive unit to the transmit unit and no interruption in the transmission of data occurs.

Figure 6:
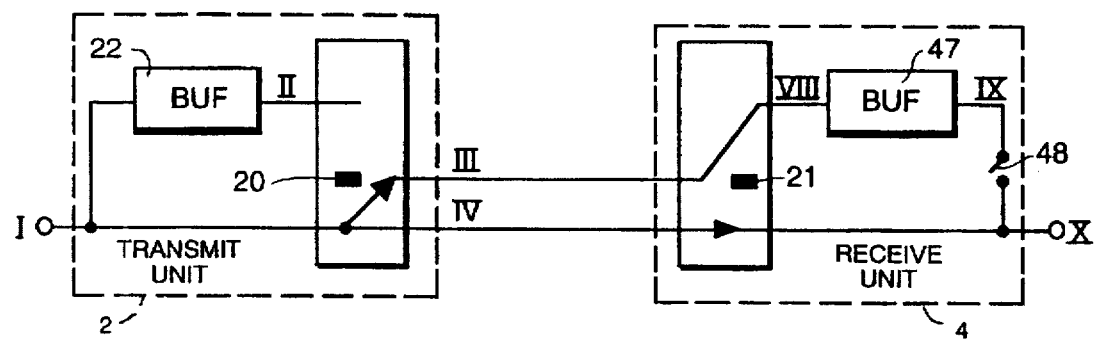
FIG. 6 is a block diagram of the system of FIG. 1 when a fault has been repaired.

In the example shown in FIGS. 3a–3f, transmission on link 12 is restored at time G. This is detected at the receive unit by the reception of multiplexed data over link 12 from the multiplexer 20. The path length of the repaired link may be slightly altered with respect to the original owing to the repairs carried out, in which case the intermittent data (signal V) will be out of alignment with the continuous data on link 14 (signal VI). The signal V on link 12 is realigned to restore the delay on the link 12 with respect to the signal VI on link 14 (time H). Once alignment is restored, the receive unit signals to the transmit unit which, after delay indicated by $D_3$, places continuous data on link 12 and switch 49 directs the signal (V) on link 12 to fill the receive buffer 47, as shown in FIG. 6. The buffer 47 is filled over the period indicated by J.

Figure 7:
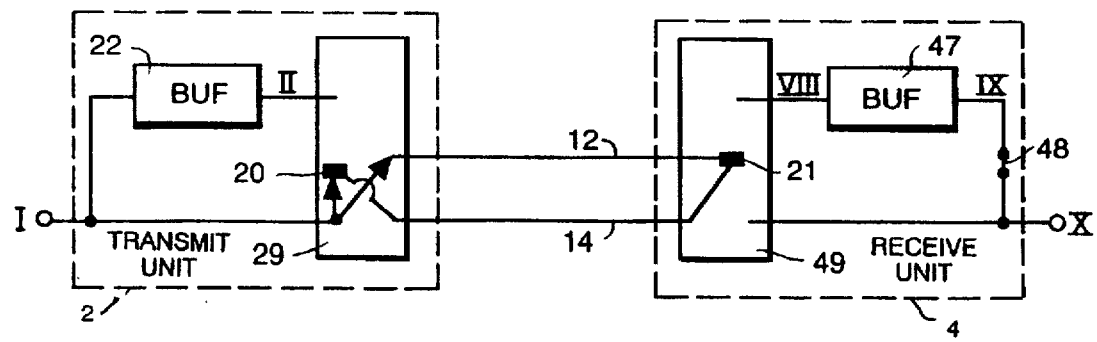
FIG. 7 is a block diagram of the system of FIG. 1 as normal operation is being re-established.

Once the buffer 47 is filled, the output of buffer 47 IX is switched to the output of the receive unit (as shown in FIG. 7) and the receive unit 4 signals this fact to the transmit unit. After a delay $D_5$, the transmit unit responds by restoring unbuffered multiplexed data on link 14 (time K on signal VI). This is received at the receive unit 4 after a delay $D_6$. Continuous data continues to be transmitted on link 12 until the alignment of link 14 with respect to link 12 is restored (time L). Once realignment is achieved, the receive unit signals the transmit unit to place unbuffered multiplexed data on link 12 and normal operation resumes (indicated by M).

Figure 8:
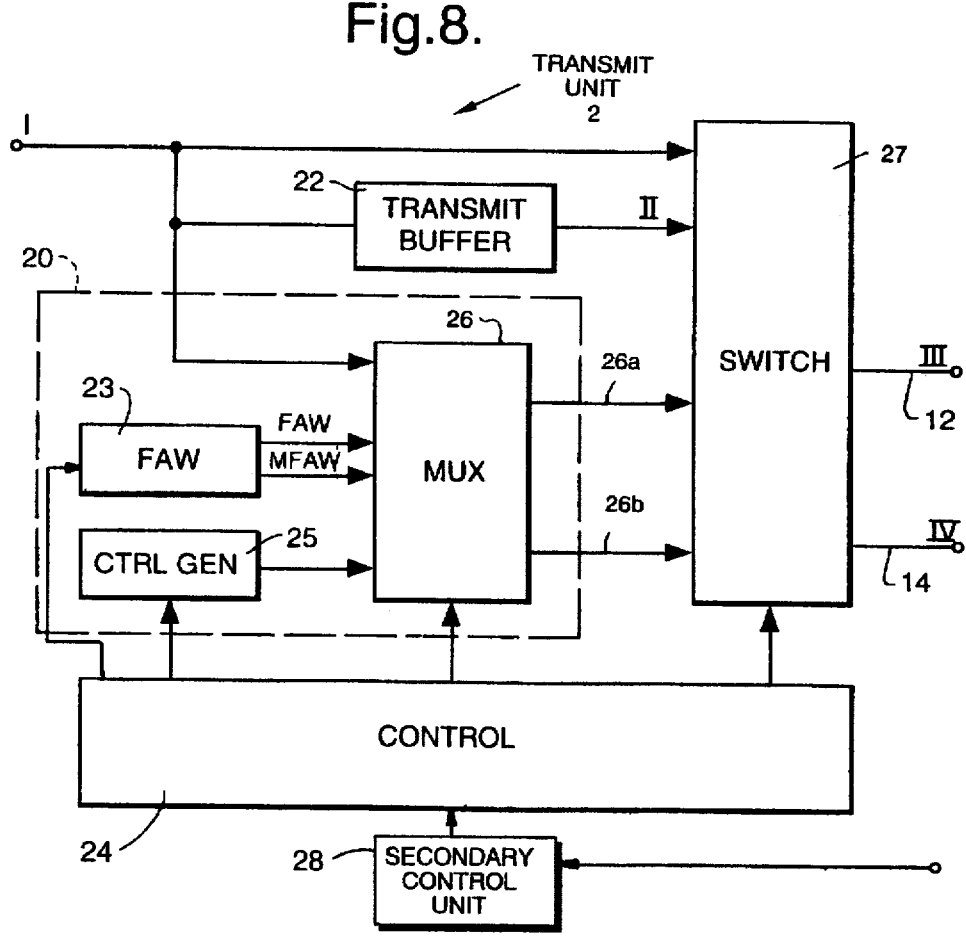
FIG. 8 is a detailed diagram of a transmit unit of a data transmission system as shown in FIG. 1.
Figure 3B:
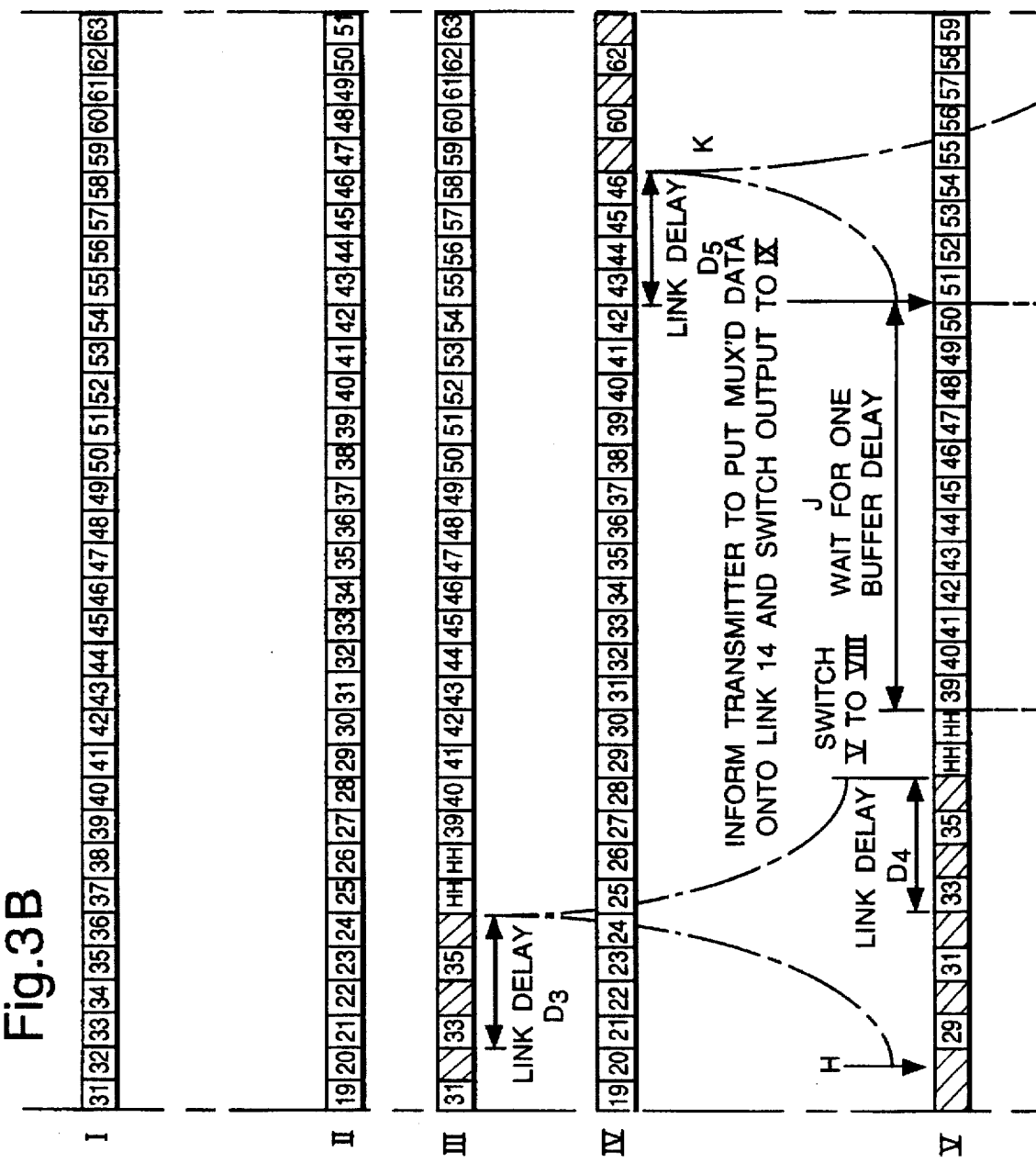
Figure 3F:
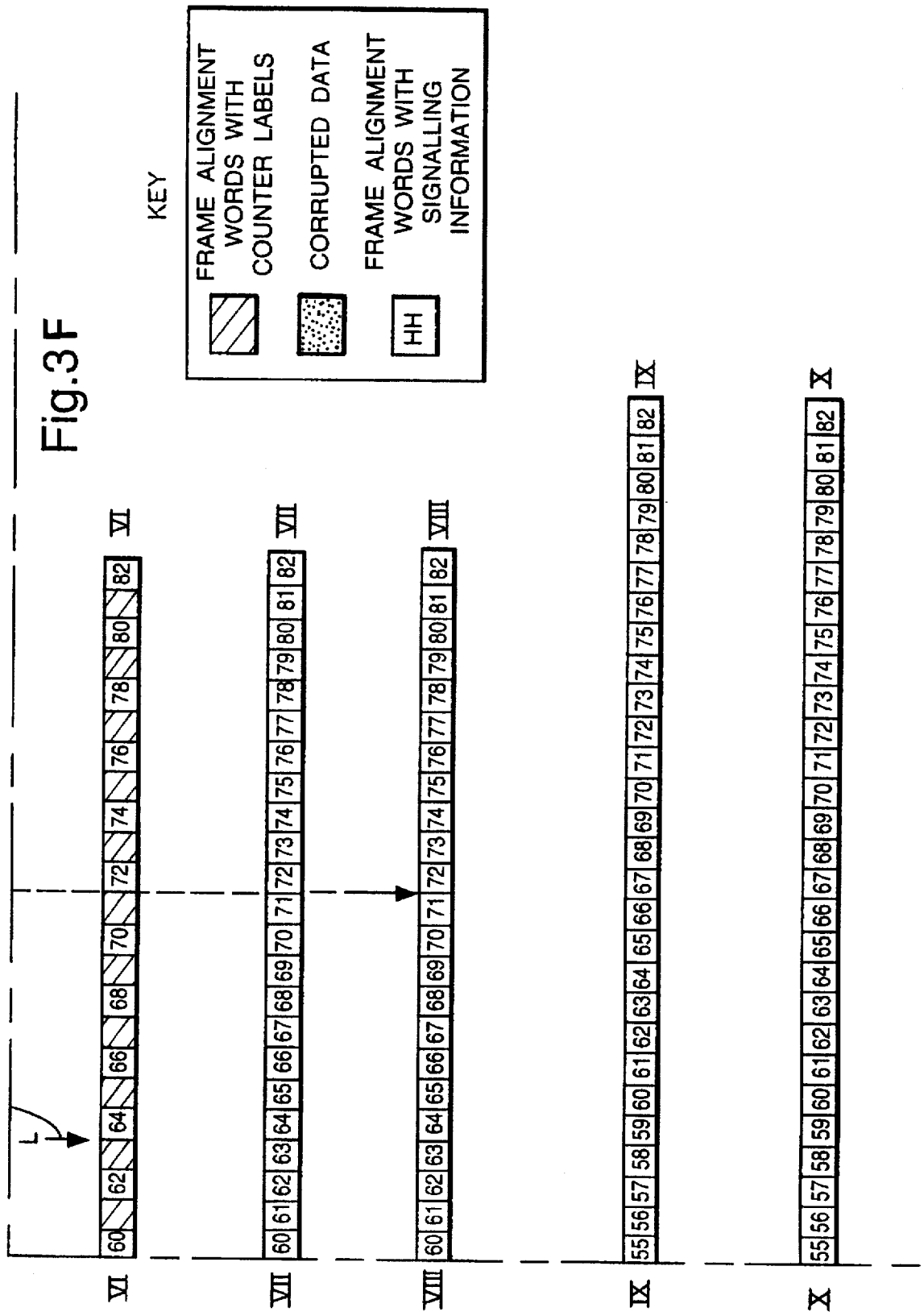

FIG. 8 shows a more detailed diagram of the transmit unit 2. As described above, the data transmission transmit unit 2 comprises a transmit buffer 22. This is a FIFO buffer capable of storing at least $2(t_2-t_1)+t_{det}$ worth of data for retransmission during a switching operation, where $t_2$ and $t_1$ are the transmission delays on the two transmission links 12 and 14 and $t_{det}$ is the fault detection time of the receive unit 4. A frame and multiframe alignment word generator 23 generates a fixed pattern frame alignment word (FAW) which is multiplexed into the outgoing data under direction from a control unit 24. In addition, two multiframe bits (MFAW) are attached to the FAW for link alignment purposes. The first bit identifies the start of a multi frame to allow synchronisation. The second bit identifies the link in use: it is set to one on link 12 and 0 on link 14. The duration of the multiframe is greater than $(t_2-t_1)$ to allow the receive unit 4 to establish the path length difference between link 12 and link 14.

A control code generator 25 receives instructions from the control unit to generate various control words for forward communication to the receive unit. These are interpreted by the following receive unit 4 and acted upon accordingly.

A first multiplexer 26, under the control of the control unit 24, multiplexes the data to be transmitted I, the frame and multiframe information from the alignment word generator 23 and the receive unit control signals from the control code generator 25, producing two outputs 26a, 26b. A switch 27 will normally switch the two outputs from the first multiplexer 26 straight through to the transmission links 12, 14. However, under fault conditions, live traffic I or buffered traffic II may be passed to the links (see signals III and IV of FIG. 3).

A secondary control unit 28 receives return signals from the receive unit 4 via an alternative transmission path and communicates with the control unit 24.

Referring now to FIG. 9, the data transmission receive unit 4 includes a frame alignment detection and flywheel synchroniser unit 40 for each transmission link 12, 14. Each unit 40 detects the frame alignment words (FAW) in the incoming data signals III and IV and passes a signal to a control unit 41 to indicate whether the FAWs have been detected. Errors within the FAW are indicated to an error estimator unit 42. Once the units 40 have detected the frame alignment words, alignment synchronisation pulses 40a, 40b and the data signals 45a, 45b are input to respective control field handlers 43 which demultiplex the rest of the control field from each of the signals 45a and 45b and establish multiframe alignment by means of the multiframe alignment word 36 (as shown in FIG. 2). A flywheel mechanism provides error resilience. A multiframe alignment synchronisation pulse 43a, 43b is sent to alignment circuitry 44 for subsequent link alignment purposes. Any errors within the multiframe signal are indicated to the error estimator 42. Loss of multiframe alignment is also signalled to the control unit 41. The control field handler 43 sends the demultiplexed receive unit control words 38 to the control unit 41 for processing.

If any unknown receive unit control words are detected an error signal is sent to the error estimator unit 42. Errors within the frame alignment words, the multiframe alignment patterns, the data field and the receive unit control signals are all indicated to the error estimator unit 42, which makes a decision as to the severity of the error and signals the control unit 41 accordingly.

The alignment circuitry 44 is presented with the data signal 45a, 45b from each data link and the alignment pulses from the control field demultiplexers 43. Data from one link is aligned to that of the other link by means of a dynamic buffer within the alignment circuitry. The alignment circuitry 44 counts the number of system clock pulses from a system clock 51 between a multiframe synchronisation pulse 43a from one link 12 and the multiframe synchronisation pulse 43b from the other link 14. Comparing this count with the known period between multiframe synchronisation pulses, the longer of the two links can be identified and a delay difference computed. Data from the shorter of the two links is delayed in the dynamic buffer by an amount equal to the relative delay difference. Thus, once the two data streams have been aligned, the multiframe alignment patterns within the control fields of the two links are staggered by the length of one control field. The dynamic buffer is chosen to be of sufficient length to cope with the maximum expected path difference and also the relative drifts between the two clocks due to temperature fluctuations. For fibre in the ground, the variation in delay due to temperature fluctuations is 80 ps/km°C. Assuming a length difference of 300 kilometers and a temperature difference of 25° C., then the maximum delay drift would be 600 ns, which is eleven 17.5 MHz clock cycles.

A demultiplexer 50 accepts the two aligned data streams V, VI together with markers indicating data/control fields from the alignment circuitry 44 and demultiplexes the data and the control fields to recover the transmitted data signal VII.

The receive unit 4 further includes a receive buffer 47 which has the capacity to store at least the same amount of data as the transmit buffer 22. A switch 49 determines which of the signals V, VI or VII is input to the receive buffer as described with reference to FIGS. 3a–3f and 4 to 7. The receive buffer 47 is followed by a switch 48 that is operated by the control unit 41. As explained with reference to FIGS. 3a–3f and 4 to 7, the switching out of the receive buffer 47 and the switching in of the retransmitted data by switch 48 occurs simultaneously to avoid corruption at the instant of the switching. The same is true of the switching of the transmit buffer 22 and the switch 24 in the transmit unit.

A transmit unit control unit 46, which communicates with control unit 41, transmits return control signals via an alternative transmission path to the secondary control unit 28 (as shown in FIG. 8) of the previous transmit unit 2 in the data transmission chain.

Figures 10, 11:
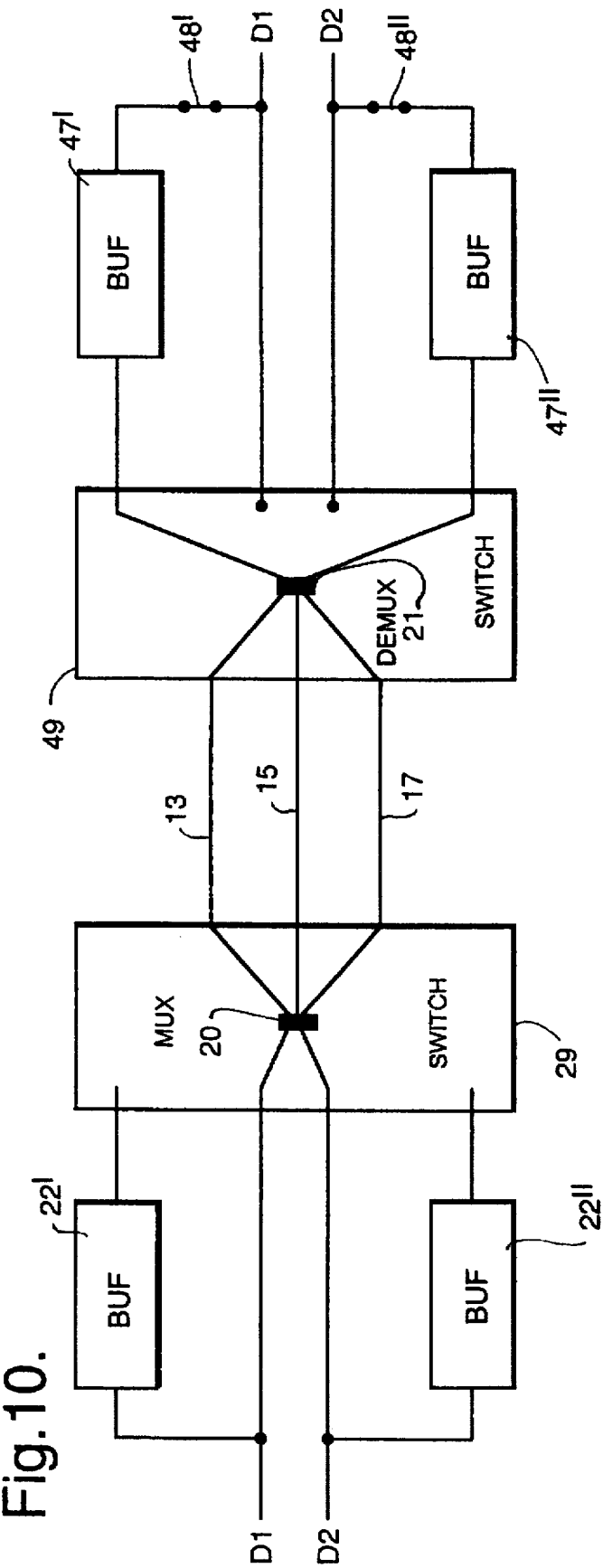
FIG. 10 shows a second embodiment of a protected data system according to the invention.
FIG. 11 is a timing diagram for the signals of the system of FIG. 10.

The above described embodiment of the invention provides a protected data system between two points. One back up link is provided for each transmission link (1 for 1 protection). Alternatively, one back up link may be provided for multiple transmission links (1 for n) or m back up links for n active links, where m<n. For instance, FIG. 10 shows an arrangement for the transmission of two data signals D1 and D2 between two points, three transmission links 13, 15, 17 being provided (1 for n where n=2). A transmit buffer 22', 22" is provided in the transmit unit for each of the incoming data signals. The transmit unit also includes a switch 29 and a multiplexer 20 as described above. The receive unit comprises a demultiplexer 21 and a switch 49 as in the first embodiment described above and a receive buffer 47', 47" and a switch 48', 48" for each of the data signals.

In normal operation, as shown in FIG. 10, the two data signals D1 and D2 and the control data are multiplexed by the multiplexer 20 and the framing structure is as shown in FIG. 11, with each link carrying two frames of data for each control frame.

If a fault occurs on one of the links, say link 13, the data stored in both of the receive buffers 47', 47" will be corrupted. If an error in the control data is detected, the receive unit signals to the transmit unit to resend the data stored in the transmit buffers 22', 22". The buffered data is transmitted, unmultiplexed, from the buffers 22 over the two remaining links 15,17 and the receive buffers 47', 47" are synchronously switched out by switches 48. Continuous data continues to be transmitted through the transmit buffers 22 and over the remaining links, as described above with reference to the 1 for 1 embodiment, until the fault is mended.

Once multiplexed data is detected on the 'faulty' link 13, the unbuffered data on link 13 is aligned with the data on the other two links, allowance being made for the possibility of a changed path length as described above. The receive buffers 47 need to be switched in and filled before normal operation resumes. Thus, the receive buffer 47' is switched to link 13 and unbuffered, continuous data from one of the incoming data streams is transmitted on link 13 to fill the first receive buffer.

Once the first receive buffer 47' is full, its contents are output to the subsequent apparatus. The receive unit then signals the transmit unit which responds by switching out the transmit buffer 22' and placing continuous unbuffered data from the other data stream on to the link 15 which previously carried the buffered first data stream. At the same time, the receive unit switches in the second receive buffer 47" and this is filled by the second data stream. Once this buffer is filled, the receive unit signals the transmit unit to send multiplexed data on the third link 17. This multiplexed data is aligned with the data on link 13 and 15 and then the receive unit signals the transmit unit to place multiplexed data on links 13 and 15. The data at the receive unit is processed in a similar manner to that described in relation to a 1 for 1 embodiment i.e. the demultiplexer combines the received data into its constituent parts to form the data signals D1 and D2.

The framing structure of the multiplexed data will need to be designed according to the number of links the data transmission system comprises.

Figure 12:
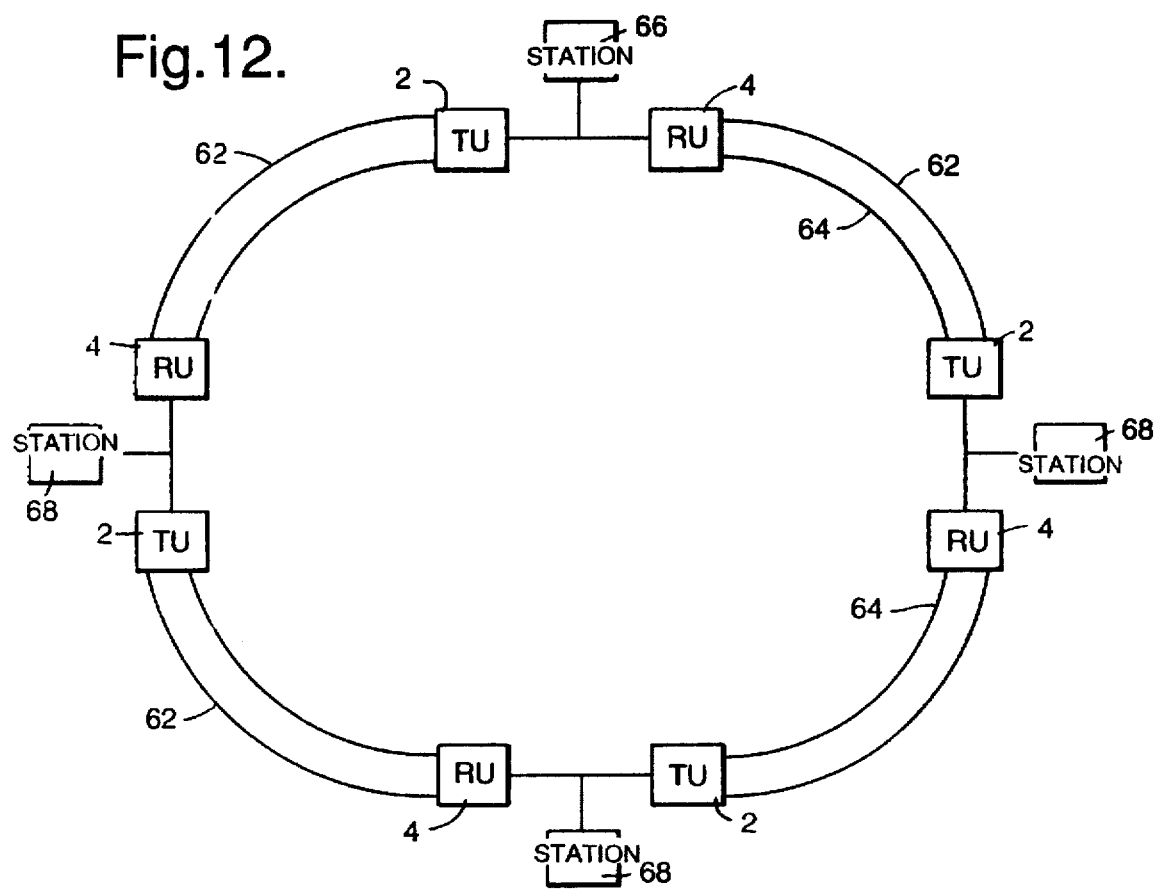
FIG. 12 shows a third embodiment of a protected data system according to the invention.

FIG. 12 shows a further embodiment of the invention in which the data transmission system comprises two links 62, 64 (1 for 1) connecting a number of stations. In this embodiment data is sent from any station 66 to a plurality of other stations 68. At each station a receive unit 4 and a transmit unit 2 are connected in series and the data signal extracted from a point between the two, as shown in FIG. 12. Alternatively a 1 for n system may be provided.

Figure 13:
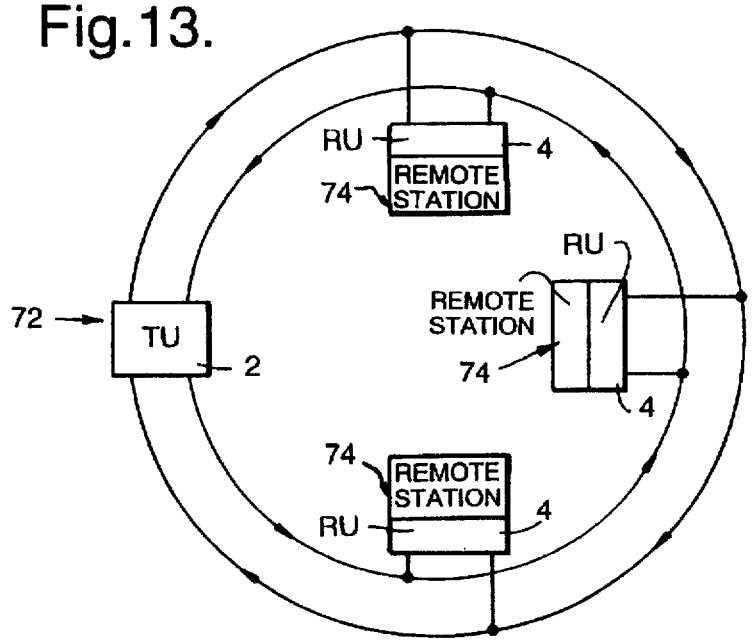
FIG. 13 shows another embodiment of the invention similar to that shown in FIG. 12.

FIG. 13 shows a further embodiment, similar to that shown in FIG. 12, in which only one of the stations 72 can transmit information, the remaining remote stations 74 including a receive unit 4. The transmit unit 2 of the originating station 72 switches to fault mode if any of the remote receive units 4 signals to the transmit unit 2 that a fault has occurred. Normal operation is resumed once all the receive units 4 are realigned.

The system of the invention may also be used with a single transmission link between the transmit unit and the receive unit. If an error is detected in the received data signal (say V), for instance as shown at point A of FIG. 3, the delayed data from the transmit buffer 22 is transmitted on the same transmission link, so that the data indicated at point F occurs on link 12. The transmit unit 2 then signals the receive unit that unbuffered data is to be sent (H in FIG. 3b) and the receive unit switches the received data signal to the buffer input as well as the receive unit output. Once the buffer is full (after period J), the receive unit output is returned to the delayed version (IX) output from the buffer as indicated.

We claim:

1. A data transmission system comprising:
   a transmit unit for transmitting a data signal to a receive unit via at least two transmission links,
   the transmit unit including a buffer for generating a delayed version of a data signal to be transmitted, the transmit unit being switchable between a first mode in which the data signal is transmitted and a second mode in which the delayed version is transmitted,
   the receive unit including a buffer for generating a delayed version of a received data signal, detection means for detecting errors in the received data signal and means responsive to such detection to send a command to effect switching of the transmit unit from the first mode to the second and to switch the receive unit from a first mode in which the delayed version of the received data signal is conducted to a receive unit output to a second mode in which the received data signal is conducted to the receive unit output,
   the transmit unit further including multiplexing means for generating at least two multiplexed signals from the data signal to be transmitted and control data including alignment information and for transmitting, in said first mode, each multiplexed signal over a separate one of the at least two transmission links, and
   the receive unit further includes means for aligning the multiplexed signals received over the transmission links and for demultiplexing the multiplexed signals to retrieve the received data signal.

2. A data transmission system according to claim 1 wherein, in the first mode, the transmit unit is arranged to transmit the multiplexed signals over the transmission links and, when a switching command is received, the transmit unit is arranged to transmit the delayed version of the data signal over a single transmission link.

3. A data transmission system according to claim 1 wherein the receive unit includes means for continually aligning the data received via the transmission links.

4. A data transmission system according to claim 1 wherein for the transmission of n data signals each of a maximum bandwidth of w bits/sec, 2n transmission links are provided, each transmission link having a capacity greater than or equal to w.

5. A data transmission system according to claim 1 wherein for the transmission of a n data signals each of a maximum bandwidth of w bits/sec n+1 transmission links are provided, each transmission link having a capacity greater than or equal to w.

6. A method of transmitting a data signal comprising:
   generating a delayed version of a data signal,
   generating at least two multiplexed signals from the data signal and control information,
   selectively transmitting either the multiplexed signals via at least two transmission links or the delayed version of the data signal,
   examining a received data signal obtained from the multiplexed signals received from said at least two transmission links for errors,
   generating a delayed version of the received data signal and selectively outputting either the received data signal or the delayed version thereof,
   in normal operation, transmitting the multiplexed signals over the at least two transmission links and outputting the delayed version of the received data signal from the receive unit,
   if an error is detected sending a command to effect transmitting of the delayed version of the data signal in a continuous manner over a transmission link and outputting the received data signal.

7. A method according to claim 6 wherein, in order to resume normal operation, the data signals transmitted over the transmission links are aligned and, once alignment has been achieved, the transmission of multiplexed data is resumed.

8. A method according to claim 6 further comprising transmitting n data signal(s) of a maximum bandwidth w bit/sec over 2n transmission links, each transmission link having a capacity greater than or equal to w.

9. A method according to claim 6 further comprising transmitting n data signal(s) of a maximum bandwidth w bit/sec over n+1 transmission links, each transmission link having a capacity greater than or equal to w.

10. A receiver comprising:

means for receiving at least two multiplexed signals from at least two respectively corresponding transmission links, each signal including data and control information, demultiplexing means for demultiplexing the control information and the data from the received signals, alignment means for aligning the received signals and forming a received data signal, a buffer for generating a delayed version of the received data signal, the receiver being switchable between a first mode in which the delayed version of the received data signal is conducted to a receiver output and a second mode in which the received data signal is conducted to the receiver output, the receiver further having detection means for detecting errors in the received data signal and means responsive to such detection to switch the receiver from the first mode to the second mode and to signal a remote transmitter to resend the data signal.

11. A receiver according to claim 10 characterised in that, the receive unit includes a dynamic buffer which, in use, causes the data transmitted on one link to be delayed with respect to another link by an amount equal to the difference in delay between data transmitted on the two links.

12. Apparatus for transmitting a data signal comprising:

a buffer for generating a delayed version of the data signal;

a multiplexer for multiplexing the data signal and control information over at least two transmission links;

switching means for determining which of the data signal, the multiplexed data signal or the delayed version of the data signal is to be transmitted over which of the transmission links; and means for receiving a command from a receiver and responsive to such command to effect switching of the switching means;

wherein normal operation, the switching means is arranged to transmit multiplexed data over the transmission links and, when a switching command is received, the switching means is arranged to transmit the delayed version of the data signal over a single one of the transmission links.

13. A data transmission system comprising:

a plurality of data transmission links having respective transmission delays which may differ;

a data transmitter connected to buffer input data thereto and to output delayed input data in a backup mode and undelayed input data in a normal mode;

said data transmitter including a multiplexer connected to multiplex said output data in said normal mode onto said plurality of data transmission links;

a data receiver connected to said plurality of data transmission links to de-multiplex and buffer received data therefrom and to output delayed received data in a normal mode and to output undelayed received data in a backup mode; and said data receiver including an error detector connected to synchronously switch said receiver and transmitter to their respective said backup modes of operation in response to detection of error in received data.

14. A data transmission system as in claim 13 wherein said multiplexer, when operating in said backup mode, does not utilize at least the one(s) of said data transmission links associated with the detected error that has caused operation in the backup mode.

* * * * *